UNITED STATES PATENT OFFICE.

C. ALEXANDER MARTIUS, OF BERLIN, ASSIGNOR TO THE FARBFABRIKEN, FORMERLY BRÖNNER, AT FRANKFORT-ON-THE-MAIN, PRUSSIA, GERMANY.

MANUFACTURE OF ARCHIL-RED AZO COLORS.

SPECIFICATION forming part of Letters Patent No. 334,257, dated January 12, 1886.

Application filed November 9, 1885. Serial No. 182,252. (Specimens.)

*To all whom it may concern:*

Be it known that I, C. ALEXANDER MARTIUS, director of the Actien Gesellschaft für Anilin Fabrication, of Berlin, Prussia, Germany, a subject of the King of Prussia, German Emperor, and a resident of the city of Berlin, have invented new and useful Improvements in the Manufacture of Red Coloring-Matters, of which the following is a specification.

This invention relates to a process for the manufacture of archil-red azo colors by combining the betanaphthylaminemonosulpho acid obtained according to claim 1 of the application of Dr. Hugo Prinz, Serial No. 130,431, filed May 5, 1884, for United States Letters Patent, with paradiazonitro-benzole.

If a solution of a salt of paradiazonitro-benzole be allowed to act upon an alkaline solution (or a solution containing acetic acid) of the betanaphthylaminesulpho acid manufactured according to the invention described in the specification of the above-mentioned application for patent, an azo color will be produced dyeing similarly to archil.

The process of manufacture is as follows: 13.8 kilograms of paranitraniline are dissolved in one thousand five hundred liters of water and fifty kilograms of commercial hydrochloric acid, and converted into the diazo compound by addition of twenty-eight kilograms of a solution containing twenty-five per cent. of sodium nitrite. This is run into a solution of 24.5 kilograms of betanaphthylamine-sulphonate of sodium and thirty kilograms of acetate of soda dissolved in five hundred liters of water. The solution is then stirred for a few hours, during which the formation of the coloring-matter takes place. This is allowed to stand for twenty-four hours, and is then neutralized with soda heated to 80° centigrade and precipitated with a hot solution of common salt. The color is now filtered off, pressed, and dried.

I claim—

The above-described process for the manufacture of an archil-red azo color, which process consists in the combination of betanaphthylaminemonosulpho acid obtained according to the first claim of Dr. Hugo Prinz's hereinabove-mentioned application for United States Letters Patent No. 332,829, and dated December 22, 1885, with paradiazonitro-benzole.

In testimony whereof I have signed my name to this specification in the presence of two subscribing witnesses.

C. ALEXANDER MARTIUS.

Witnesses:
 B. ROI,
 M. W. MOORE.